Patented Sept. 9, 1930

1,775,621

UNITED STATES PATENT OFFICE

FRED PATEE, OF CASPER, WYOMING

COMPOSITION FOR BUILDING MATERIALS AND METHOD FOR PRODUCING THE SAME

No Drawing.   Application filed January 6, 1926.   Serial No. 79,678.

This invention has for its principal object the manufacture of a fire proof building material such as could be used for shingles, wood, doors, door frames, window frames and in fact, most any material of a similar nature used in building construction.

The invention has for a further object to provide an asbestos base material for building materials.

The invention has for a further object in the use of scrap rubber such as is obtained from old tires and the like in combination with the asbestos base.

That the invention may be more fully understood reference is had to the following description which gives a preferred embodiment of the composition of invention and a method for producing the same.

For example, I take asbestos Serpentine Rock whose analysis may be—

| | Per cent |
|---|---|
| Silicic acid | 43.26 |
| Magnesia | 40.38 |
| Lime | 1.04 |
| Iron oxide | 0.89 |
| Alumina | 2.34 |
| Moisture | 12.09 | which I then grind and roll. This rock should preferably be nearly free of iron compounds. Whether the rock contains fiber or not is immaterial so long as the material functions as an asbestos product.

I then take this ground material and mix it up into a stiff mixture with a saturated solution of borax. If desirable, I then add about ten per cent of ground scrap rubber materials, for example, material obtained from grinding up old tires, cord and all. This mixture, with or without the scrap rubber, I call my compound.

To this compound, I then add enough sulfur and rosin to make the mixture hold together after baking. Then, I add enough "core oil," linseed oil or the like, to make the mix workable and then after kneading through a mixer or press or rolls, it is then run into suitable moulds. For example, I would use twenty (20) pounds of rosin and twenty (20) pounds of sulphur to three hundred (300) pounds of the compound, above mentioned. Of course other proportions are suitable, but I prefer the proportions given. "Core oils", as a rule are a linseed oil base. So far as I know there are a very large number of "core oils" on the market to be used for cores in foundry work. I have tried several of these and they all give satisfactory results, as I use them as a binder, as they would be used in a foundry. After being in the moulds, it is pressed into shape, the pressure varying depending on the material being made. The material is then removed from the moulds and put into an oven where it is subjected to a heat of approximately one hundred and fifty (150) degrees Fahrenheit for approximately seventy (70) minutes, which is then run up to approximately three hundred and fifty (350) degrees Fahrenheit, or more as desired, where it is held from three and one-half (3½) to five (5) hours. If the material being made is of such nature that it can be heated while in the moulds, then I prefer to do it in that manner.

On removal from the oven, the material is ready for use.

I do not limit myself to the description given as I realize that modifications of it may be used in order to produce the same results and the formula and description which I have disclosed is for the sake of illustration of a preferred embodiment, and I do not wish to be limited thereby.

What I claim is:—

A composition of matter composed of asbestos rock, borax, scrap rubber, sulphur, rosin and core oil in suitable proportions, and adapted to be molded and baked substantially as described.

In witness whereof, I have hereunto affixed my hand this 23rd day of December, 1925.

FRED PATEE.